(12) United States Patent
Genna

(10) Patent No.: US 6,369,390 B1
(45) Date of Patent: Apr. 9, 2002

(54) SCINTILLATION CRYSTAL WITH REDUCED LIGHT SPREADING

(75) Inventor: Sebastian Genna, Belmont, MA (US)

(73) Assignee: Digital Scintigraphics, Inc., Waltham, MA (US)

(*) Notice: Subject to any disclaimer, the term of this patent is extended or adjusted under 35 U.S.C. 154(b) by 0 days.

(21) Appl. No.: 09/633,458

(22) Filed: Aug. 8, 2000

(51) Int. Cl.[7] .......................... G01T 1/202; G01T 1/161
(52) U.S. Cl. ............................... 250/368; 250/370.11
(58) Field of Search ........................... 250/368, 369, 250/367, 370.11, 483.1, 487.1, 390.11

(56) References Cited

U.S. PATENT DOCUMENTS

| | | |
|---|---|---|
| 4,095,107 A | 6/1978 | Genna et al. |
| 4,228,515 A | 10/1980 | Genna et al. |
| 4,532,425 A | 7/1985 | Abileah et al. |
| 4,584,478 A | 4/1986 | Genna et al. |
| 4,593,198 A | 6/1986 | Pang et al. |
| 4,700,074 A | * 10/1987 | Bosjakovic ................. 250/368 |
| 5,185,529 A | 2/1993 | Smith et al. |

FOREIGN PATENT DOCUMENTS

JP        4-290983        * 10/1992 ................. 250/368

* cited by examiner

*Primary Examiner*—Georgia Epps
*Assistant Examiner*—Richard Hanig
(74) *Attorney, Agent, or Firm*—Iandiorio & Teska

(57) ABSTRACT

A scintillation camera crystal includes a plurality of light scattering holes in the crystal extending toward the photosensor and communicating with at least one surface of the crystal, the crystal is formed from a first material and the holes include a second material differing from the first material for deflecting the light generated by the scintillation crystal in response to incident gamma rays and reducing the spread of the generated light.

30 Claims, 16 Drawing Sheets

SCINTILLATION CRYSTAL WITH REDUCED LIGHT SPREADING

RELATED APPLICATIONS

The U.S. Government may have certain rights under this patent pursuant to Grant No. 1 R43 CA83455-01.

FIELD OF INVENTION

This invention relates to an improved scintillation camera crystal, and more particularly to such a crystal with increased scattering and reduced light spreading.

BACKGROUND OF INVENTION

Radionuclide emission scintillation cameras, also called Anger cameras, are used to image the distribution of gamma-ray emission radioactive material within a body part or organ, such as the brain, breast or heart, for example, for diagnostic purposes. A source of radiation is administered to the patient, which typically consists of a pharmaceutical tagged with a gamma-ray emitting radionuclide designed to go to and deposit in the organ or elements of the body under diagnostic examination, such as for example in the detection of a lung tumor. Gamma rays emitted by the radionuclide are received and detected by the camera, the position of each detected ray event is determined, and the image of the radioactivity distribution in the organ or other body part is constructed by known techniques from an accumulation of events.

Scintillation cameras usually employ an optically continuous scintillation crystal, such as thallium activated sodium iodide, NaI(Tl), sodium activated cesium iodide CsI(Na), thallium activated Cesium iodide CsI(Tl), and others as gamma-ray energy transducers. The energy of the gamma-rays are absorbed in the crystal and converted to light emissions called scintillation events, each light event having an energy proportional to the energy of the absorbed gamma-ray. In conventional cameras, light is transmitted from the crystal through a transparent interface (window) to an array of photosensors. The optical window may be rigid such as glass, which is coupled to the scintillator and the photosensors by silicon gel or optical grease, for example. The optical window may also be an optically transmitting liquid, which also directly couples the scintillator to the sensors.

The optically coupled array of photosensors, usually photomultipliers, or photodiodes, absorb and convert light to electrons by the photoelectric effect and the electrons are amplified by the sensor. Amplified signals generated from photosensors in the vicinity of the scintillation event are then mathematically combined by known analog or digital means to determine the position and the energy of the gamma-ray absorption in the crystal.

In general, the scintillation camera method works best with thin crystals so that the spread of the light transferring to a photosensor array is less than the width of a photosensor. In most high resolution cameras capable of detecting a high number of events per second (high count rate) it is preferable to detect a large fraction of the emitted light in a small number of photosensors, usually in clusters in the range of seven to nine, in the vicinity of the event. Increasing the spread of light beyond a minimum needed for good position resolution results in reduced count rate due to pulse pileup as well as poorer resolution, because light spreading to photosensors distal to the scintillation event inhibit the simultaneous position determination of spatially overlapping light spreads from multiple events. For thick crystals, e.g., 20 to 30 mm thick employing photomultipliers as photosensors, for example, light scintillations emitted as a consequence of the absorption of gamma-rays typically spread over much larger numbers of photomultipliers and, although various schemes have been developed to reduce the effect of pulse pileup these invariably result in poorer imaging characteristics by degrading both position and energy resolutions.

While crystals of about 10 mm thick, or smaller, are useful for detecting most of the so-called "single photon" emitters, which typically have energies of 150 keV, thicker crystals are needed to detect high energy emissions with reasonable efficiency, as for example the pairs of 511 keV gamma-rays emitted as a result of positron annihilation. The efficiency of 10 cm thick scintillation crystals for the detection of pairs of annihilation gamma-rays, using coincidence detection means, is about 12% of that for detecting 150 keV single photons.

Another problem, more manifest in thicker crystals, is that gamma rays absorbed near the surface give rise to light spreads that are broader than rays that are absorbed deep into the crystal. As a result, both the energy and spatial resolutions of a camera, which registers the cumulative results from light emissions from all depths of absorption, is compromised unless corrections for depth of absorption can be made. This well-known phenomenon has been described by Gagnon, U.S. Pat. No. 5,576,546, in a disclosure of a method to determine the depth of interaction of gamma rays so as to correct for resulting resolution degradations.

SUMMARY OF THE INVENTION

It is therefore an object of this invention to provide improved scintillation camera crystal.

It is a further object of this invention to provide such a crystal which decreases spreading by increasing scattering of the light generated by the crystal.

It is a further object of this invention to provide in which the spread of light from a scintillation can be tailored as a function of the depth of the absorption in the crystal of the gamma ray generating the scintillation.

It is a further object of this invention to provide for narrowing the spread of light leaving the scintillation crystal in transit to photosensors of a scintillation camera.

It is a further object of this invention to provide a scintillation crystal with narrower light transfer functions to the photosensors of a scintillation camera.

It is further an object of this invention to provide thick scintillation crystal with improved light transfer functions.

It is a further object of this invention to provide improved gamma ray sensing efficiency even with thick crystals.

It is a further object of this invention to provide improved count rate for cameras using thick crystals.

It is further an object of this invention to provide improved energy discrimination for thick crystals.

It is further an object of this invention to provide improved spatial resolution for thick crystals.

This invention results from the realization that an improved scintillation crystal with less spreading can be achieved by using a plurality of holes in the crystal which contain some material different than the material of crystal to defect the light generated by the crystal and increase its scattering.

This invention features a scintillation camera crystal including a plurality of light scattering holes in the crystal extending toward the photosensor and communicating with at least one surface of the crystal. The crystal is formed by a first material and the holes include a second material which differs from the first material for deflecting the light generated by the scintillation crystal in response to incident gamma rays and reducing the spread of the generated light.

In a preferred embodiment, the holes may communicate with both surfaces of the crystal. The second material may refract the light. The second material may have a different index of refraction than the first material. The second material may be air. The second material may include a reflective coating. The holes may be arranged in a random pattern or a regular pattern. The regular pattern may include squares or triangles. The hole may be cylindrical. The holes may be tapered. They may be stepped. They may be inclined to the surfaces of the crystal. They may be perpendicular to the surface of the crystal. The holes may be right circular cylinders. At least one of the surfaces of the crystal may be grooved. Both of the surfaces of the crystal may be grooved. The grooves may form an array of pyramidical structures. The crystal surface toward the photosensors may be transmissive while the other surface of the crystal may be reflective. The holes may be arranged in a uniform density pattern or a non-uniform density pattern. The holes may uniform in size and/or shape. The crystal may be spherical, arcuate or planar. The crystal may be segmented.

BRIEF DESCRIPTION OF THE DRAWINGS

Other objects, features and advantages will occur to those skilled in the art from the following description of a preferred embodiment and the accompanying drawings, in which.

Figure 1A:
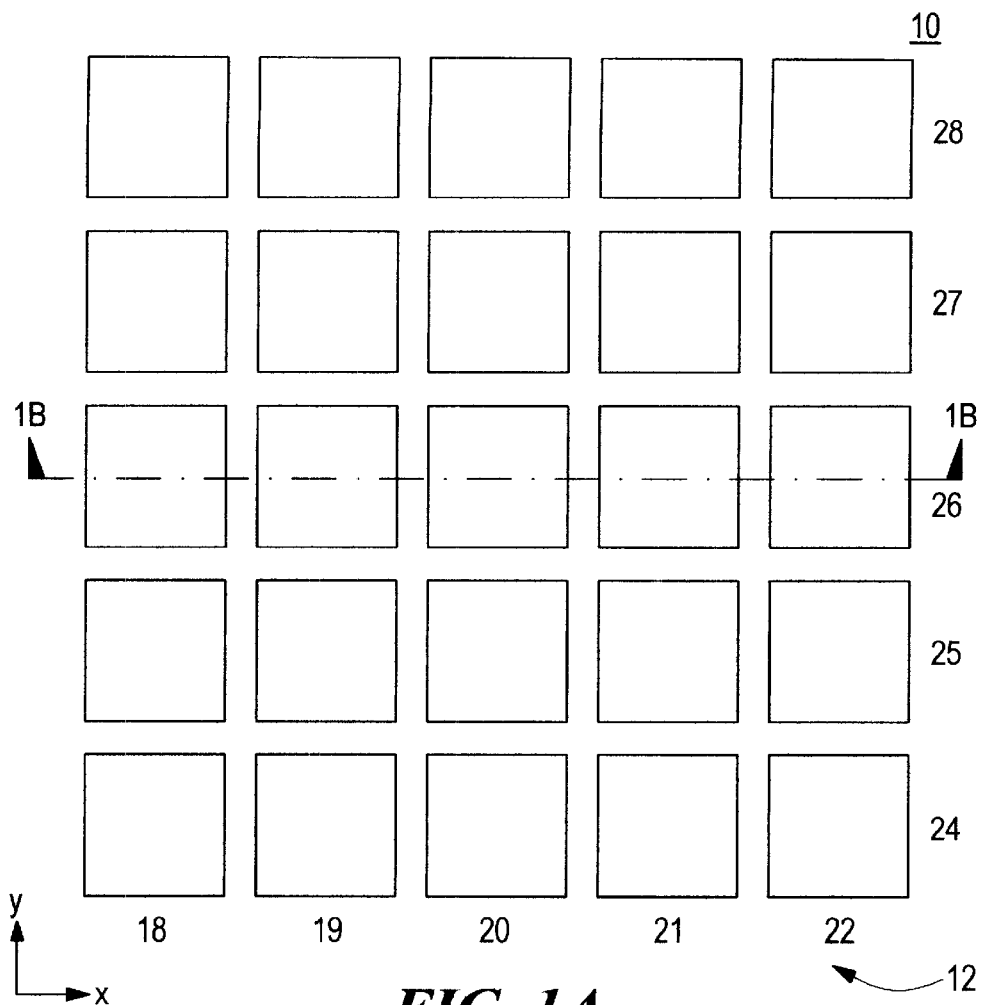
FIG. 1A is a simplified schematic top plan view of a prior art square scintillation camera.
Figure 1B:
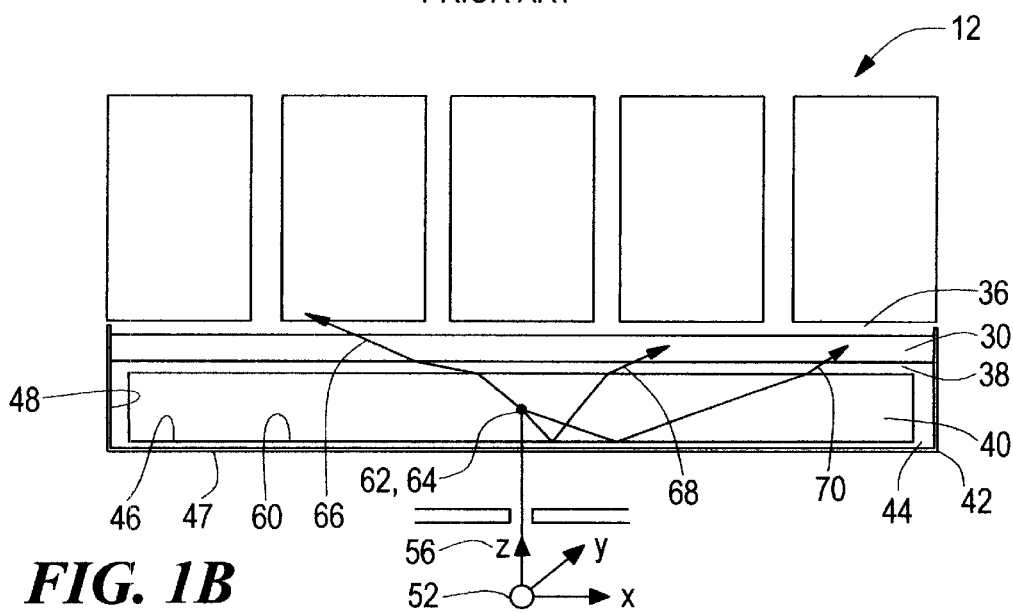
FIG. 1B is a side elevational sectional view of the camera taken along lines 1B—1B of FIG. 1A.

There is shown in FIGS. 1A and 1B a conventional planar scintillation camera 10 having a five by five square array of 25 photomultiplier 12. The photomultiplier tubes are arranged in five columns 18–22 and five rows 24–28 mounted on a glass window 30. There is included a layer of silicone grease 36 which acts as an optical coupling agent between the photomultiplier tubes 12 and the surface of the glass window 30 upon which they are mounted. On the opposite side of the glass window 30 is a layer of transparent silicone gel material 38 which acts as an optical coupling agent or interface between the glass window 30 and radiation detection means, namely scintillation crystal 40. The crystal is typically thallium activated sodium iodide [NaI (Tl)]. It is enclosed in a hermetically sealed container 42 filled with dry gas 44 which surrounds the remainder of the crystal 40 that is not joined to the glass window 30 by the silicone gel 38. The inside walls 46 of the container 42 are generally surfaces with light reflecting material, with the possible exception of the inside edge walls 48, which may alternatively be coated with light absorbing material. The container 42 includes a gamma-ray entrance window 47 that is opaque to light but transmits gamma radiation, such as indicated for emanations from a source at a position x,y 52 and collimated to travel in a direction z 56, to pass through window 47 and be received by scintillation crystal 40. Entrance window 47 is typically made of thin aluminum and made highly internally reflective, but it may be made of any material that is similarly transparent to gamma radiation.

Gamma rays emitted by source 52 directed normal to the x,y planar surface 60 of the crystal are absorbed at various depths along the z path 56 normal to the crystal surface plane. At the points of absorption within the crystal 40, such as at depth $z_1$ 62, the gamma rays are converted to scintillation light emissions 64. Some of the emitted light passes through the glass window either directly, as in ray 66, or after one or more reflections, as in rays 68 and 70, and are received by the photomultiplier 12. The photomultipliers convert the light received into electron charge pulses. Signal charges from the photomultipliers exceeding a prescribed threshold are then combined by known methods such as disclosed in U.S. Pat. No. 5,185,529 to determine the two dimensional (x,y) location of the gamma-ray absorption in the crystal from the scintillation events produced in the array of photomultipliers. In high count rate applications signals from a small cluster of tubes are used to determine the position of a scintillation event. For example, if a scintillation event occurs within the region bounding the central photomultiplier, e.g., row 26 and column 20, signals from the cluster of nine tubes surrounding the scintillation event (e.g., tubes contained within rows 25–27 and columns 19–21) may be used to determine the position of the scintillation event. Image formation from a large number of events that occur randomly in different clusters are then used for position analysis over the entire field of view using known techniques. Position analyses within a cluster is functionally dependent on the fraction of the emitted light received by each of the photomultipliers within its cluster and their subsequent normalized charge outputs, i.e., charge registered by a photomultiplier divided by the sum of the charges from the all of the photomultipliers in a cluster as a result of light absorption by their photocathodes.

Figure 2:
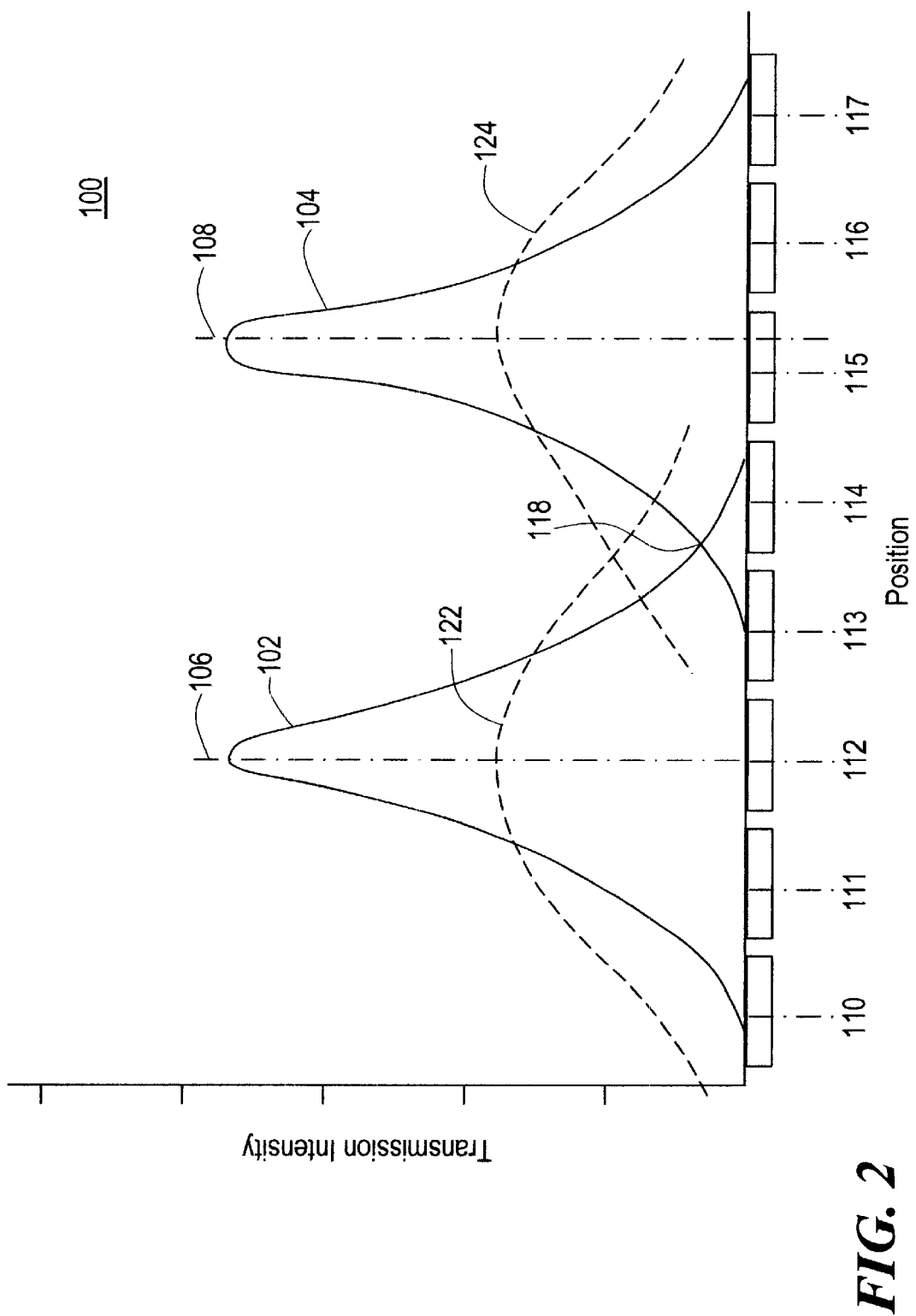
FIG. 2 illustrates typical light spreading (intensity vs. position) for thin and thick crystal detectors.

FIG. 2 shows profiles of spreads of light 100 from a 1-cm thick crystal 40 impinging on the surface of an array of photosensors 110–117, such as on the planes 80 and 81 of the photomultipliers of FIGS. 1A and B obtained by Montecarlo simulations. Spatially symmetric light distributions 102 and 104 derive from scintillations along their respective centerlines 106 and 108. Also illustrated are the lateral extensions of the photosensors 110–117, such as in the x profile of photomultipliers 12 of FIGS. 1A and B. These photosensors may also be photodiodes or position sensitive photomultiplpiers. Light from distribution 102 centered about scintillation along centerline 106 is largely accepted by the cluster of photosensors 111–113 with little signal overlap 118 from second distribution 104 from a scintillation at centerline 108. If signal overlap 118 to photosensors is small compared to primary signals 102, then signals from clusters 111–113 may be used to determine the position of the scintillation event giving rise to distribution 102. Similarly, second light distribution 104, which may be accepted and defined by cluster of photosensors 114–116 and similarly be separately analyzed without significant interference from distribution 102.

Also shown are simulated light distributions 122 and 124 emitted from the same x locations 106 and 108, but from a crystal that is three times as thick (3-cm) as is the 1-cm crystal 40. These signals overlap substantially. Thus, if the two scintillations occur during a time period of measurement, in a phenomenon known as pulse pileup, position and energy determinations using the clusters 111–133 and 114–116 are corrupted. Scintillation events that produce broader light spread functions, such as those in thicker crystals, for example, are more likely to be rejected when they occur close in time and thus severely limiting count rate. Methods exist to circumvent this problem, using well known electronic pulse shortening techniques. These result in improved temporal resolution at the expense of reliability of position and energy determinations.

Figure 3A:
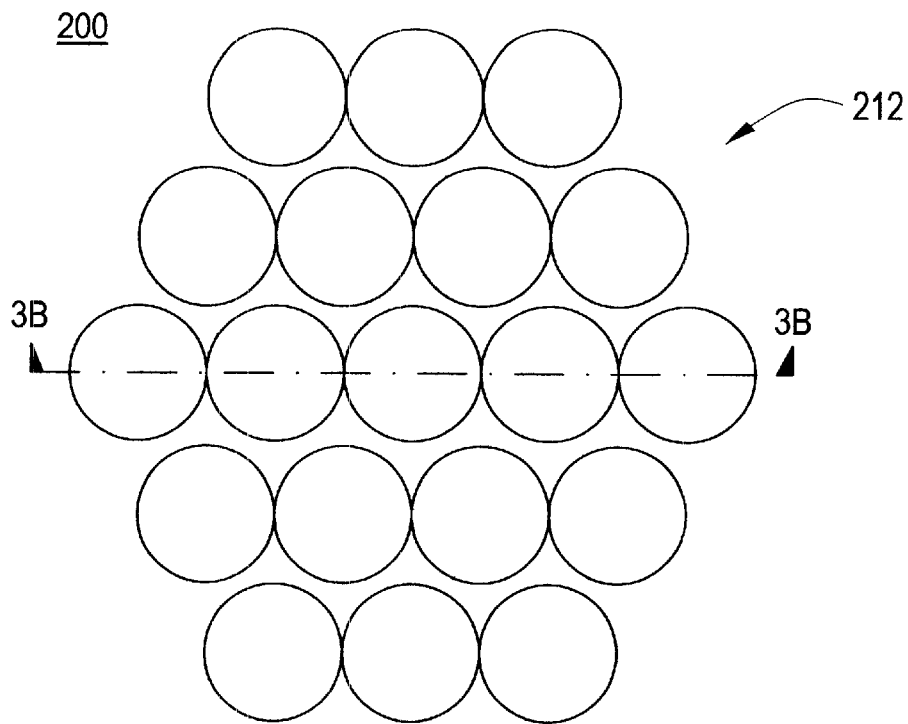
FIG. 3A is a simplified schematic top plan view of a scintillation camera using a scintillation crystal according to this invention.

FIGS. 3A and B show a lateral cross sectional view of another camera 200, constructed with a liquid interface (U.S. Pat. No. 5,652,429). The crystal 204 is housed within container 208 having all of its interior walls 210 made reflective, as with coating with white reflecting paint. The nineteen photomultipliers 212 are shown organized in a more usual hexagonal array, as illustrated in the plan view in FIG. 3A. The photomultipliers are partially housed in whole or in part within the container 208 which is filled with a liquid interfacing medium 230 which is light transmissive. All of the inner surfaces 210 of the container 208, the crystal 204 and photocathode surfaces 214 of the photomultiplier array 212 are optically coupled to each other by immersion in the liquid interface material 230. Thus, the interfacing liquid couples the upper crystal surface 232 to the photocathode surfaces 214 of the photomultipliers 212. The surface 234 of the crystal 204 facing the gamma-ray entrance window 236 is normally made reflective by coating with reflective material so as to reflect light internally in the crystal, but may be left transparent and the inner surface of the gamma-ray entrance window 138 may be made reflective. Reflecting baffles 240 U.S. Pat. No. 5,652,429 may also be used to further modify the distribution of light reaching photomultipliers 212.

The crystal 204 of the camera 200 of FIGS. 3A and B is shown to contain scattering elements 242 in accordance with the subject invention in the form of cylindrical channels extending through the thickness of the crystal. Insofar as the scattering characteristics pertinent to this invention are concerned, such a crystal could similarly be used in the more conventional non-liquid construction of camera 10 of FIG. 1.

Figure 4:
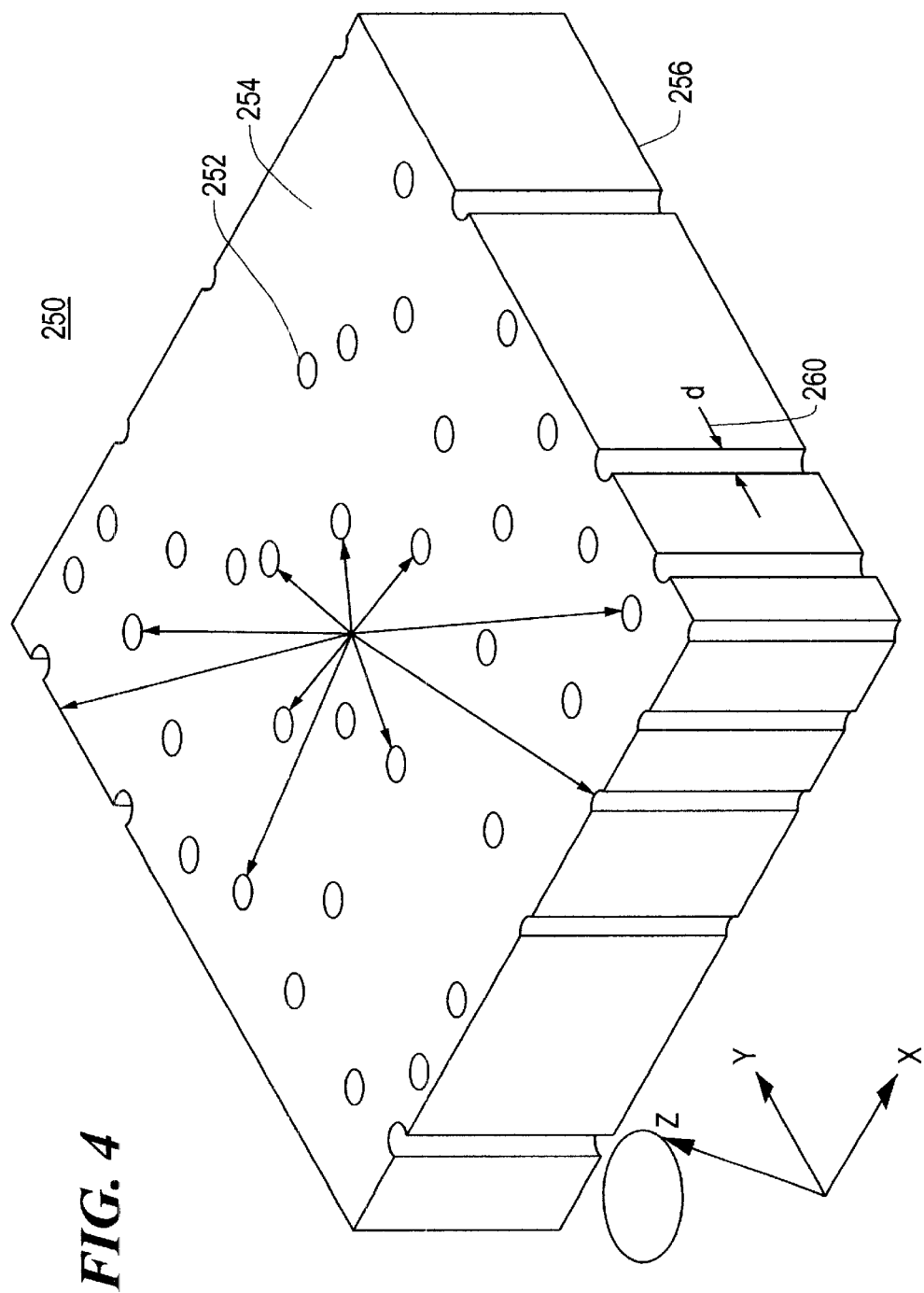
FIG. 4 is an enlarged three dimensional view of a portion of the crystal of FIGS. 3A and B containing a random distribution of cylindrically shaped scattering holes.

Segment 250, FIG. 4, of the crystal 204 illustrates how scattering can be useful in scintillation crystal. Hypothetical scattering elements 252 are shown in the form of circularly symmetrical cylindrical holes or channels having their axes normal to the top 254 and bottom 256 faces of the crystal. The holes or channels are assumed (in this section) to be vanishingly thin and randomly distributed. For light rays traveling in an x-y plane parallel to the face (top view) of the segment of the crystal 250, scatter reduces to a two dimensional classical scatter problem with circular scattering elements, where the coefficient for the scattering of light rays traveling in the illustrated plane defined by z=constant is given by $$\mu_s(\pi/2)=(\Delta n/\Delta A)d \text{ cm}^{-1}, \quad (1)$$

where $\mu_s(\pi/2)$ equals the scattering coefficient for rays in z=constant plane of the drawing (normal to the cylindrical axes, i.e., $\phi=\pi/2$), $\Delta n/\Delta A$ equals the number of elements per unit area (cm²) of the crystal in this plane and d equals the diameter 260 of each cylindrical element. The coefficient $\mu_s(\pi/2)$ defines the probability of transmission (without hitting a scattering hole or channel) as a function of path length by the equation $$P=e^{-\mu_s(\pi/2)r} \quad (2)$$

and 1–P is the probability of single scattering of a ray over a distance r (x,y).

Figure 3B:
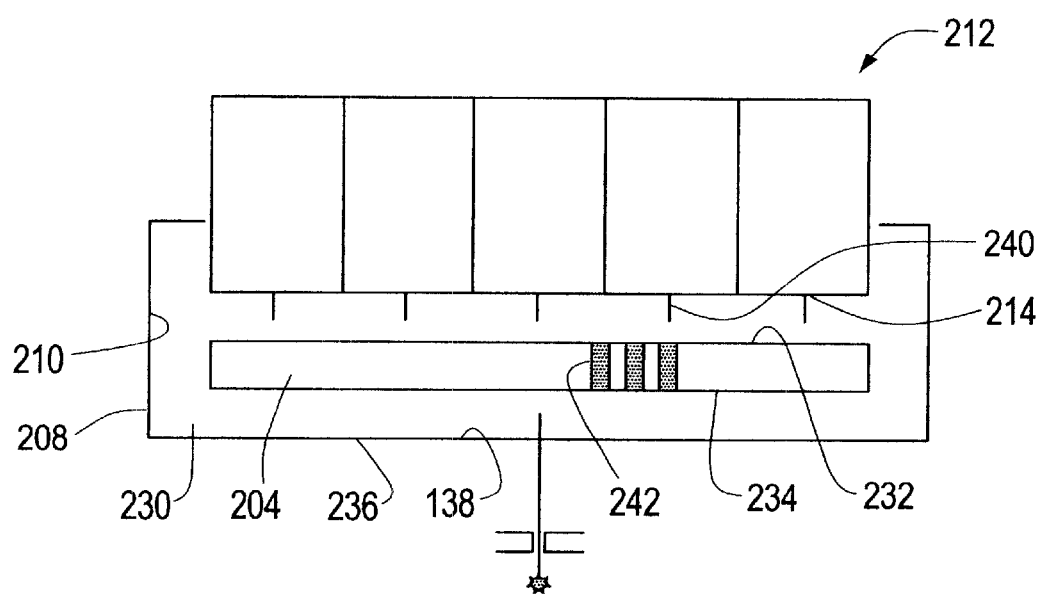
FIG. 3B is a side elevational sectional view of the camera taken along line 3B—3B of FIG. 3A.
Figure 5:
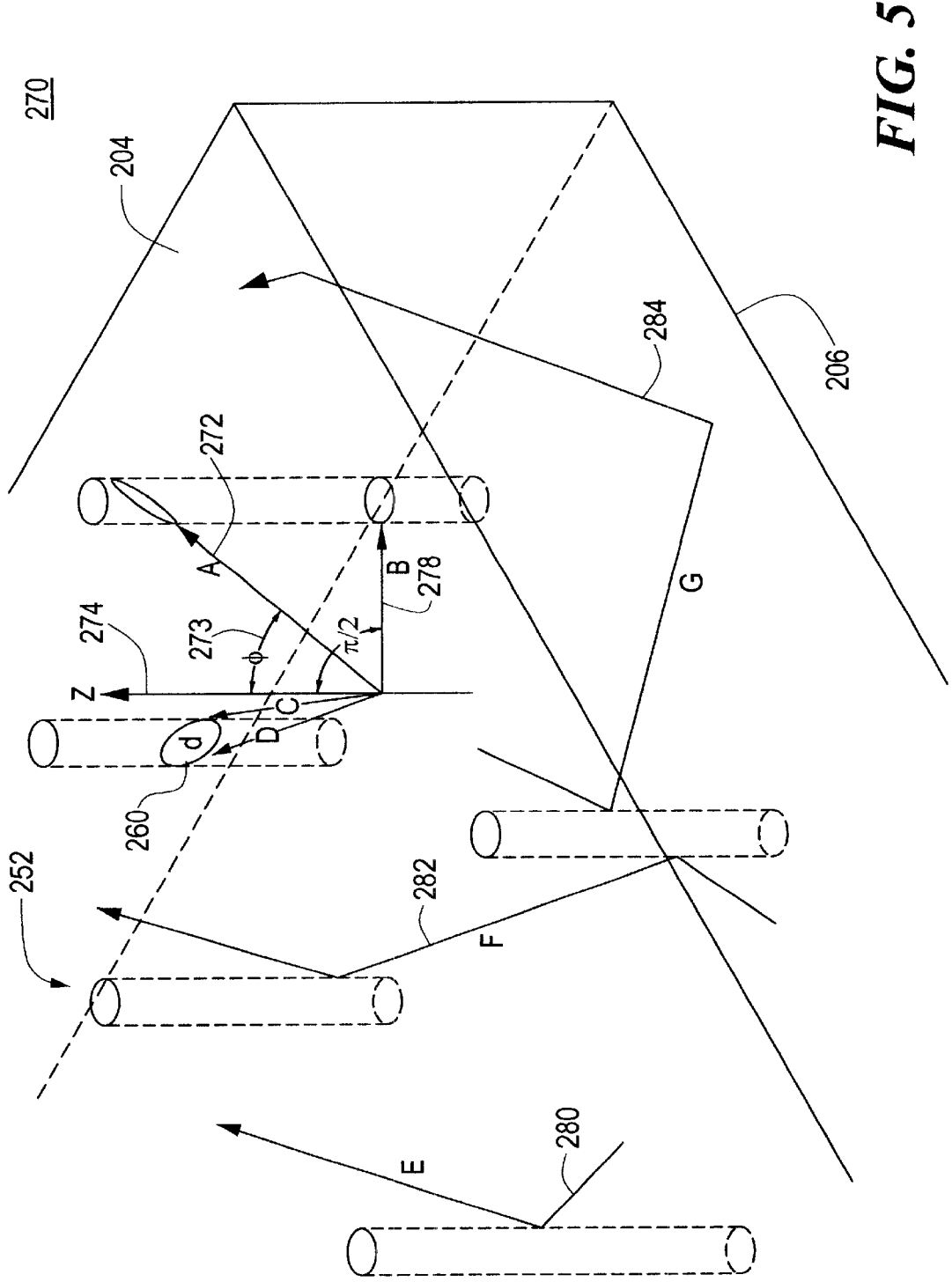
FIG. 5 is a three dimensional view of the a crystal segment of FIG. 4 illustrating light rays striking scattering holes at different angles φ relative to their axes.

FIG. 5 shows yet another view of a segment 270 of a crystal 204 of FIG. 3. If instead of π/2, light 272 subtends an angle φ273 relative to the axial direction 274(z) of the parallel circularly cylindrical scatter holes or elements (channels) 252, as is illustrated by ray A 272, the ray travels a longer distance r(x,y)/sinφ, where r(x,y) is its projection on a z=constant plane (φ=π/2) as is illustrated by ray B 278. Eq. (1) may be modified to account for this reduced scattering probability by reducing the scattering coefficient by sin φ.such that $$\mu_s(\phi)=\mu_s(\pi/2)\sin\phi \quad (3)$$

where φ 273 is the angle subtended by a light ray 272 with a z axis 274 that is parallel to the axes of the channels. Thus, the probability of a non-scattering transmission increases to one as the light rays travel normal to a surface of the crystal, which is a desirable characteristic. Since such anisotropy favors light transfer in the direction of the axes of the channels, light will exit the top crystal surface 204 (either directly after a first scatter) as in rays E 280, or by secondary scatter with one or more other channels, as in rays F 282, or by intermediate reflection from the gamma-ray-entrance surface 206, as in rays G 284. Because scatter from the cylindrical columns favors less interrupted transit at low $\phi$ directions (sin $\phi$ factor), it travels shorter longitudinal distances, r(x,y), from the event than it would under more isotropic scatter conditions (e.g., as from a distribution spherical scattering elements). This directionality of the scattering process contributes substantially to more efficient narrowing of light spread.

Figure 6:
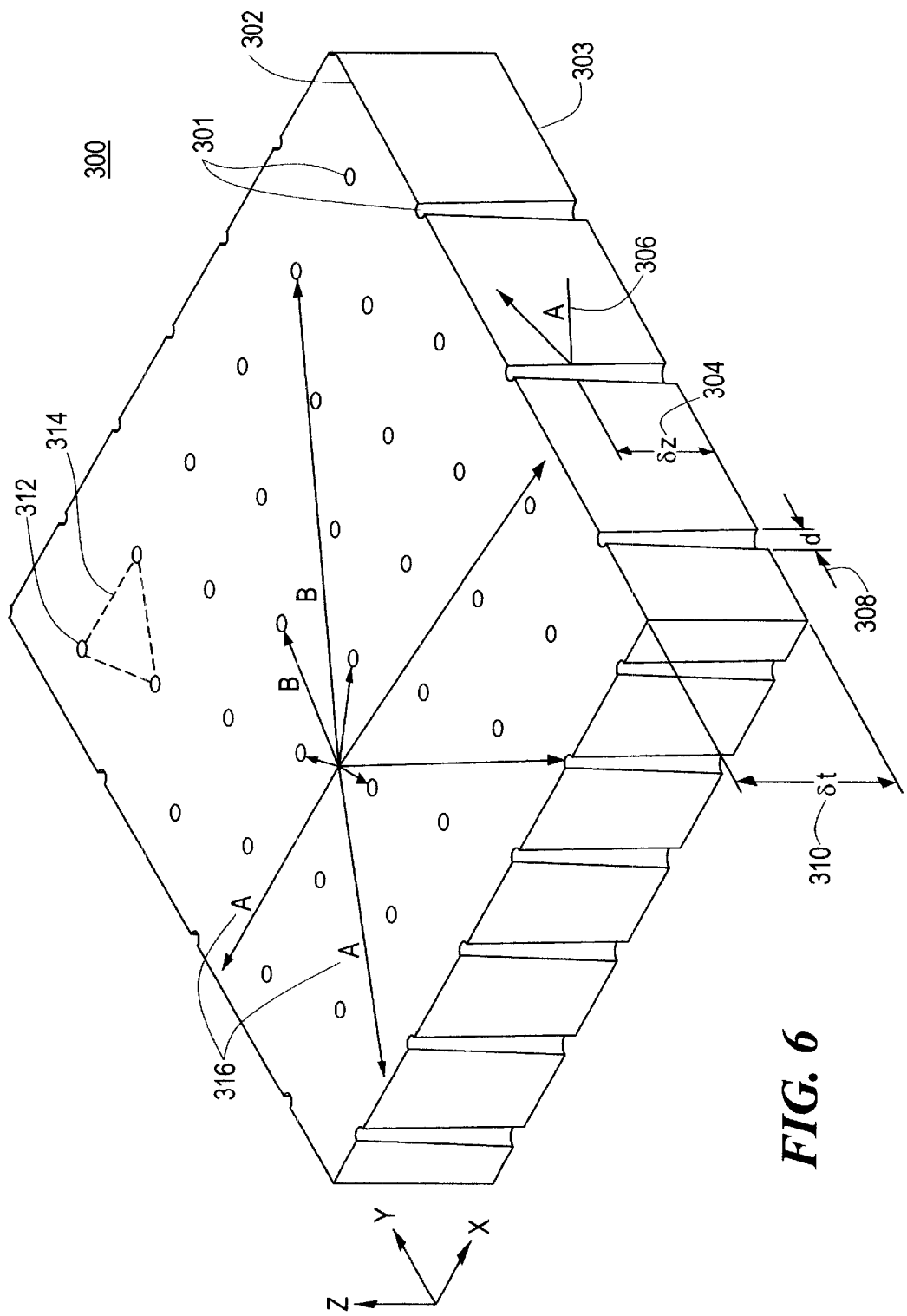
FIG. 6 shows a section of a crystal containing a triangular array of holes that are shaped as truncated cones.

Although thus far the channels or holes are shown as right circular cylinders extending all the way through the crystal none of these qualifications or their implications are necessary limitations. FIG. 6 illustrates profiles of truncated cone-shaped scattering elements 301 in a section of crystal 300. The cones 301 illustrated are narrower at the top 302 of the crystal than at the bottom 303 so that the coefficient for a scattering encounter, which is proportional to the width of the channel in accordance with Eq (1), linearly decreases with the depth of interaction (DOI) of the light ray with the scattering channel as illustrated by the depth dz 304 of ray A 306. In this case, $$\mu_s(\phi,z)=\mu_s(\pi/2,0)(1-k_2\delta z/\delta t)\mathrm{dsin}\,\phi \qquad (4)$$

where $\mu_s(\pi/2,0)$ is the coefficient for scatter at the bottom entrance face 303 of the crystal (z=0), k is a constant, $\delta z$ 304 is the DOI of the light ray with the scattering hole channel (distance from its bottom face 303) and $\delta t$ 310 is the crystal thickness. Thus, scattering is greatest when light moves both parallel to the crystal's face (the sin $\phi$ factor) and closest to its gamma ray entrance surface; the $(1-k_2\delta z/\delta t)$ factor. Such a behavior should make it possible to reduce the light-spread preferentially in the vicinity of the gamma-ray entrance window (bottom) of a crystal where the light-spreads from emissions are unavoidably greater in conventional homogeneous crystals. See U.S. Pat. No. 5,576,546.

Figure 7:
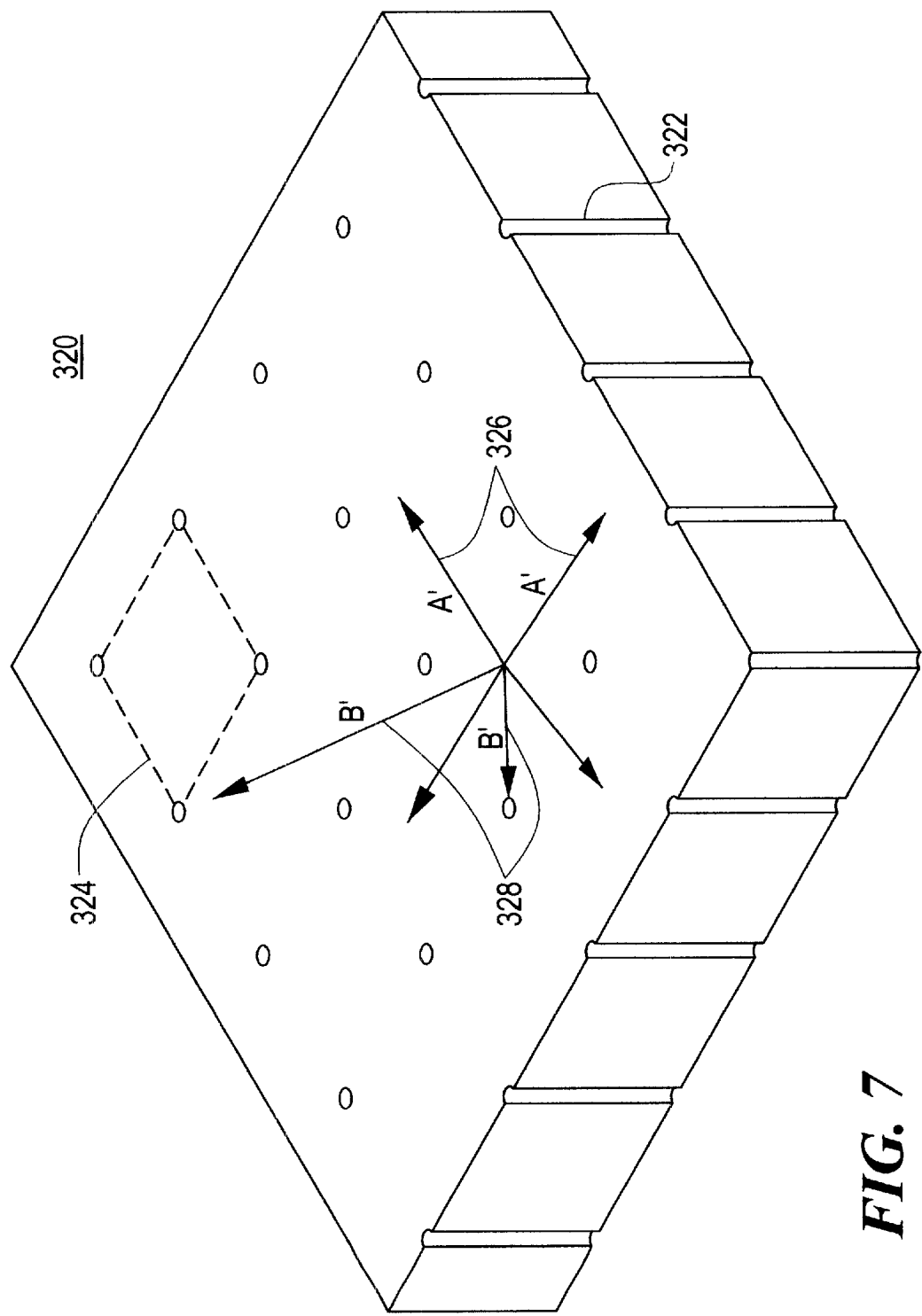
FIG. 7 shows a section of a crystal containing a square array of holes.

In practical applications, scattering channels are more easily structured in a regular array, FIG. 6, in which channels or holes 312 are arranged in a triangular array 314, such that each hole is positioned equidistant from its neighbors, or as in FIG. 7, which shows a section of a crystal 320 containing cylindrical channels 322 arranged in a square array 324. In any array, whether square 324 or triangular 314, for example, there are some light pathways for which the probability of scatter is very low, such as rays A 316 and A' 326 of FIGS. 6 and 7, respectively. Others, such as B 318 and B' 328, for which the probability is high because of the regularity of the scattering elements. Also different is the fact that, for practical reasons, the hole size is large compared to the assumption leading to Eq. (1).

Figure 8:
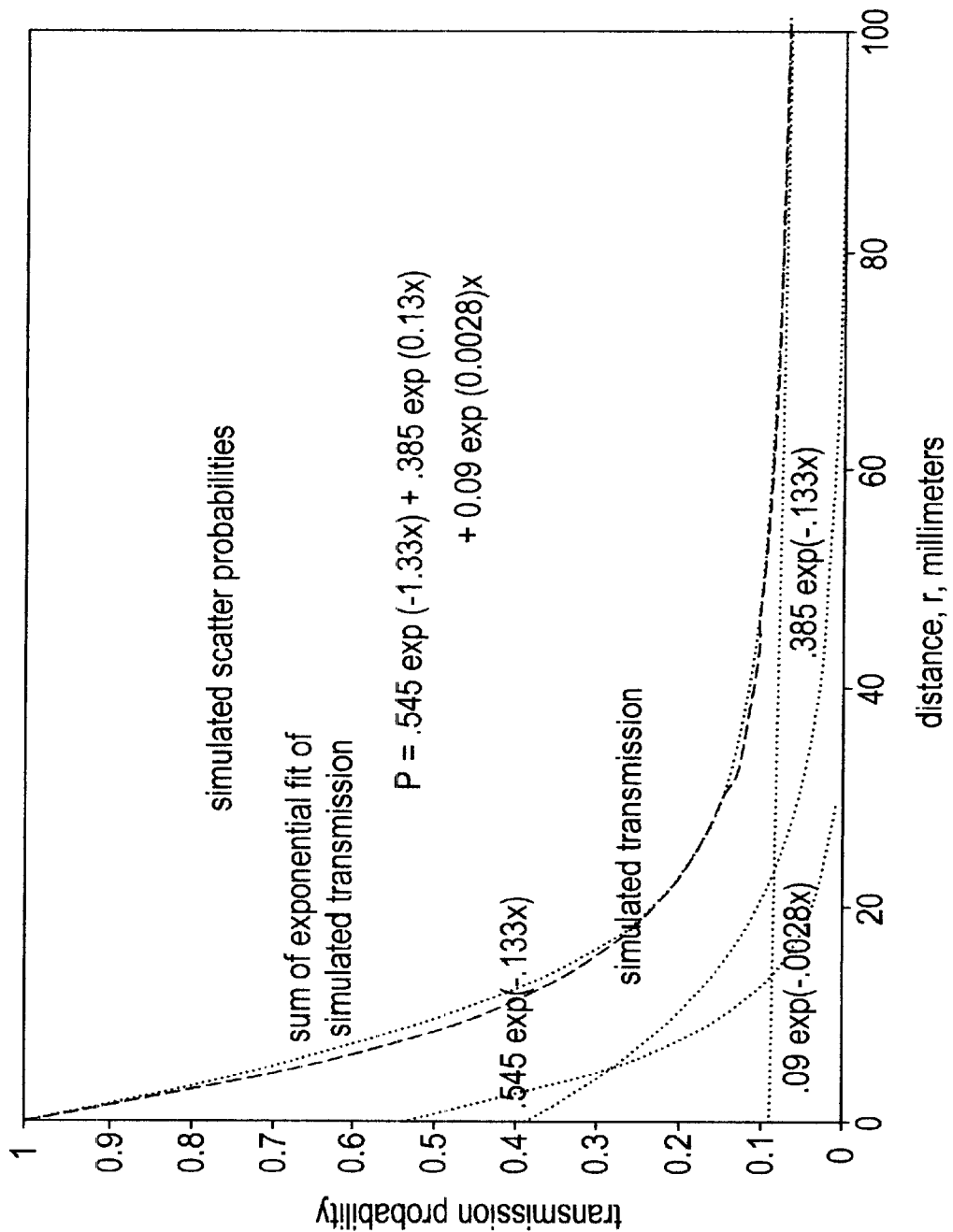
FIG. 8 shows simulated curves of scatter probabilities from an array of scattering channels.
Figure 9A:
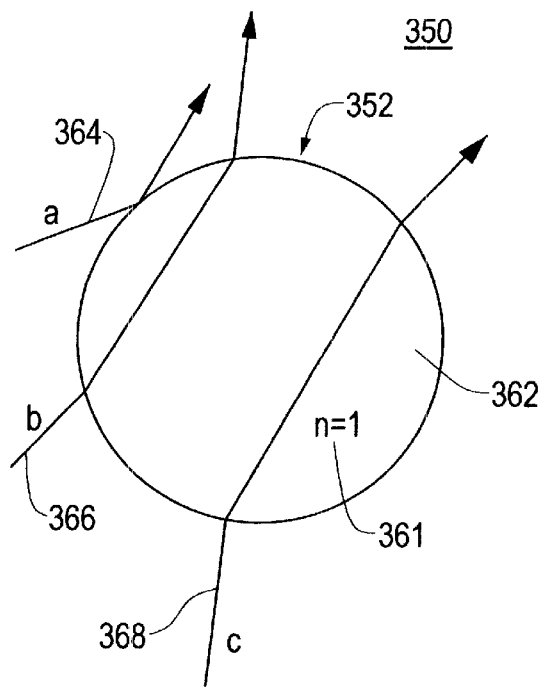
FIGS. 9A–E show cross-sectional views of differently formed cylindrically shaped scattering channels.
Figure 9B:
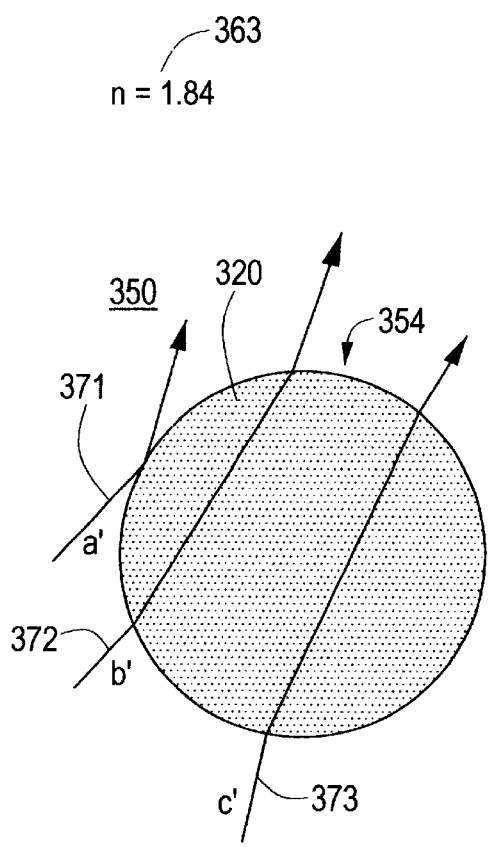
Figure 9C:
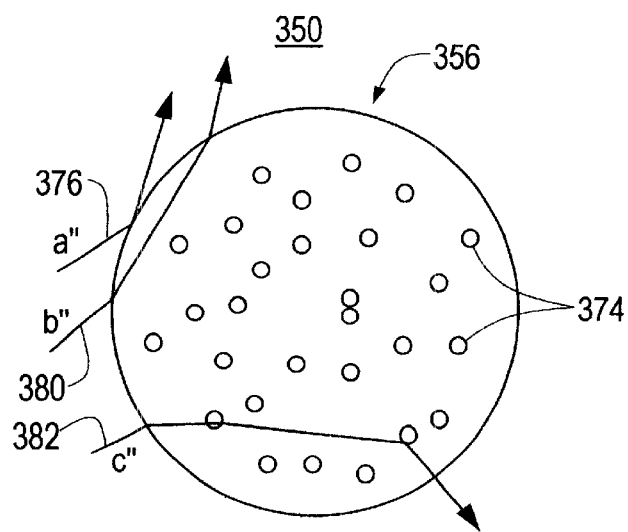
Figure 9D:
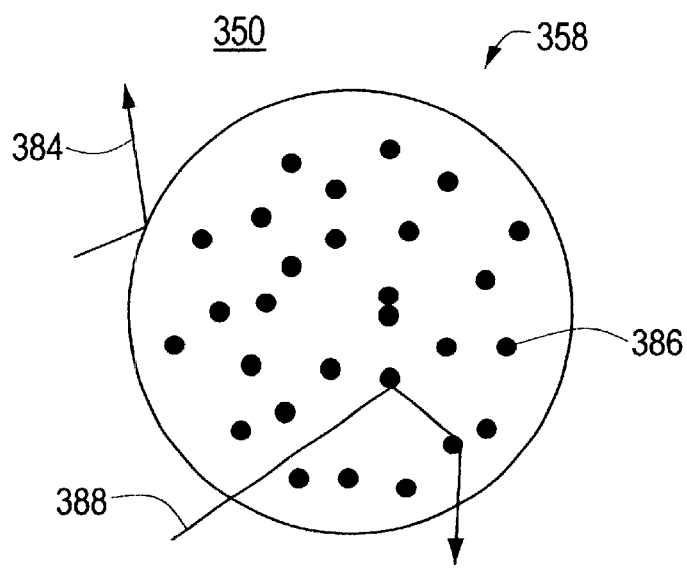
Figure 9E:
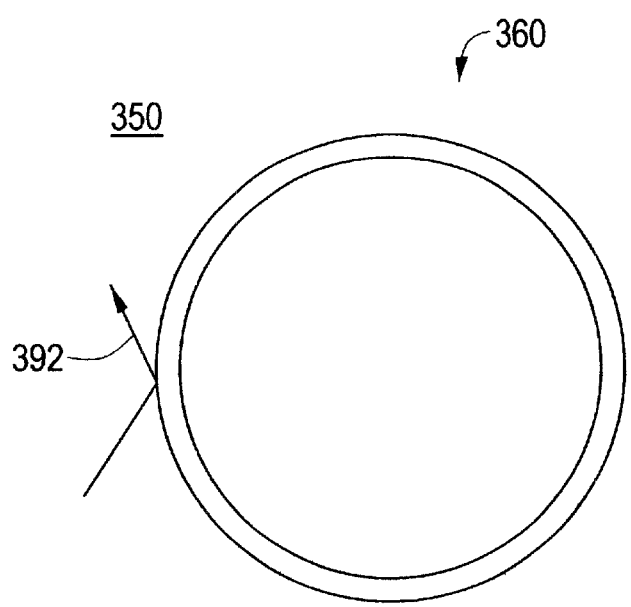

FIG. 8 shows plots of Monte Carlo calculations of the single-scatter transmission probabilities as a function of their distance of travel relative to a constant z plane, r(x,y) for a triangular array of scattering columns such as in FIG. 6. In this simulation there were assumed to be 3.2 scattering columns per cm$^2$ of crystal with each column having a diameter of 1.0 mm. Operationally, we find that a multi-exponential model reasonably accounts for the anisotropy of scatter of the triangular configuration of scattering elements. Although not physically precise, because it does not illustrate the dependence of scatter on the position of a scintillation event within the matrix of scattering channels, the average z=constant transmission probability of a ray from a scintillation event may be expressed approximately by a multi exponential function, shown as the three exponential approximation in FIG. 6.

$$P=P_1 e^{-\mu_{s1}'r}+P_2 e^{-\mu_{s2}'r}+P_3 e^{-\mu_{s3}'r}, \qquad (5)$$

in which the sum of the initial probabilities, $P_1+P_2+P_3=1$. This model accounts for rays that have different probabilities of hitting a scattering element by grouping them into separate $P_i$ populations having different scattering coefficients, $\mu_{si}$. Thus, in this example, the scattering of an array of channels can be thought of as three families of random scattering columns, each with independent scattering probabilities. Using this model, we can account for the transmission function's directional (sin $\phi$) and tapered channel width $(1-k_2\delta z/\delta t)$ dependence by $$P=[P_1 e^{-\mu_{s1}(\phi,z)r}+P_2 e^{-\mu_{s2}(\phi,z)r}+P_3 e^{-\mu_{s3}(\phi,z)r}], \qquad (6)$$

where $\mu_{si}(\phi,z)$ is defined as in Eq. (4). Similar results are obtained in analyses of square arrays of holes, such as in FIG. 7.

With these approximations, scattering may be thought of as a progression of events where rays encountering scattering columns with a probabilities equal to $1-\Sigma P_i$, are scattered in accordance with their scattering encounter and transmitted to their its next encounter, etc., until they exit from the crystal. Rays scattered into small $\phi$ angles transmit through longer distances between encounters and thus have a higher probability of exiting from the crystal.

FIGS. 9A–E show enlarged cross-sectional views 350 of five different structures of individual scattering channels 352, 354, 356, 358 and 360, respectively. Each channel is made by boring holes through the crystal of a preferred profile, e.g., tapered 301 or cylindrical 322 as in FIGS. 6 and 7. Scattering may be obtained by many means, some of which may be preferable because of their preservation of light (non absorbing) and because of the scattering characteristics that they present to the light rays. Hole 352, for example, may be filled with air or other dry gas 362 and scattering will result by Fresnel reflection and refraction because of the dissimilar index of refraction n of air (n=1) 361 and sodium iodide crystal (n=1.85) 363, such as in rays a 364, b 366 and c 368. Hole 354 may be filled with a solid, liquid or gelatinous material 370 having an index of refraction (about 1.4) between that of the crystal and air. These also reflect or refract at the surface of the channel, as in rays 371–373, but with lower scattering angles because the index of the filling material is closer to the index of the crystal. Another hole, 356 may be filled with a solid or gelatinous material such as silicone gel in which gas 374, such as dry air or nitrogen are suspended as bubbles or as microspheres. In this case scattering occurs from reflection from the surface, as in ray a" 376 (because of dissimilar gel and crystal indices) or by refraction as in ray b" 380 into the channel which may be followed by scattering within the channel from one or more of the air bubbles, as in ray c'" 382. Still another scatterer, 358, which also depends on the reflection and refraction of light rays, may be structured by suspending reflecting or refracting particles 386 diffusely within a gel or by suspending other particles, such as transparent scattering particles made of high index of refraction glass such as high index glass (n=1.9) or titanium oxide particles. In this case, scattering also occurs at the surface of the channels, as in ray 384 (because of dissimilar gel and crystal indices), and from the particles 386 by reflection or refraction at the particle interfaces, as in ray 388. Another method, shown by hole E 310, depends on surface reflection from an opaque surface coating such as $T_2O_4$ or MgO. In this case, light reflects from opaque surface coating 390 as in ray 392. This method tends to be less desirable than the others because more light energy may be lost per scattering event, thus significantly reducing light intensity after a few scattering events. The methods presented are not exhaustive as other methods may occur to those skilled in the arts. Any material which suffices to provide the desired deflection whether by reflection or refraction can be used. For example, a plug of the crystal removed to make the hole could be reinserted and the air between it and the wall of the hole could perform the task. Or the plug could be coated or textured before reinsertion.

Figure 10:
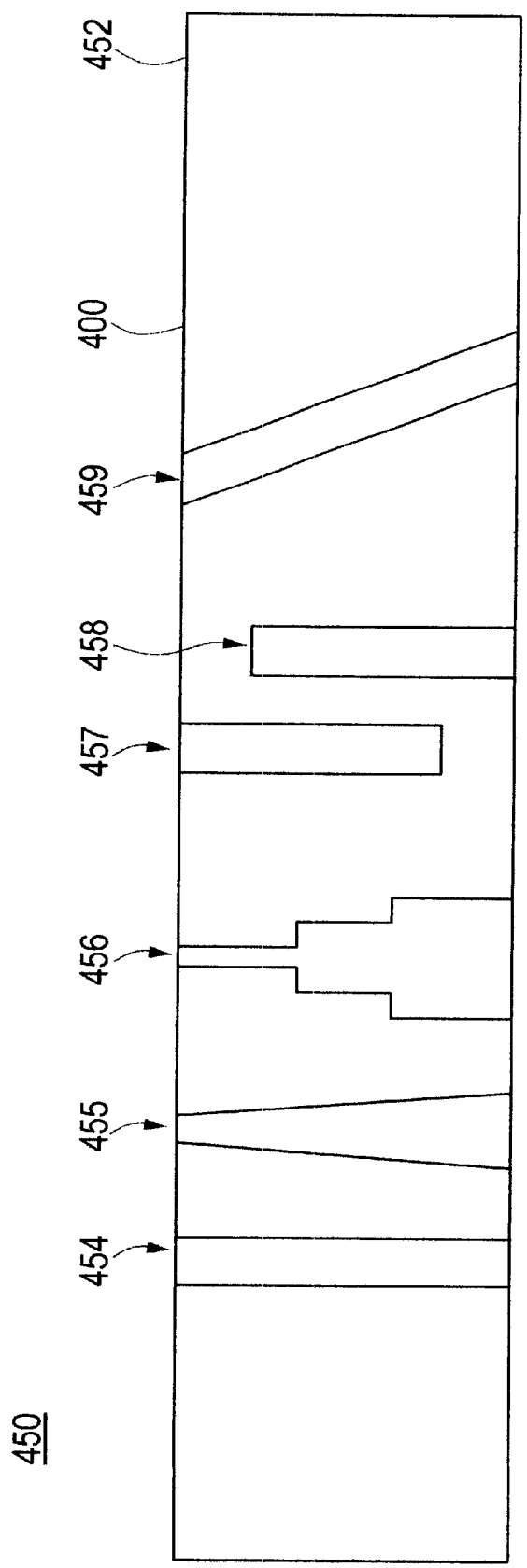
FIG. 10 shows a lateral cross-sectional view of a crystal showing scattering elements having different cross sectional shapes.

FIG. 10 shows a lateral cross section illustrating some different scattering elements or holes 450 within a crystal 452 in order to illustrate a few of the different and useful shaped holes 454–459 that may be used to cause light scatter within a crystal. Hole 454 is the cylindrical tube of FIGS. 3–6. Hole 455 is the tapered tube of FIG. 5 that is wider at the bottom than at the top of the crystal (although the inverse slope is also possible). Hole 456 is comprised of a series of stepped cylindrical bores, formed as in a telescope, so as to be wider at one end of the crystal 452. Hole 457 and 458 show that scattering holes may start at either of the two surfaces and not necessarily penetrate the other. Although all of these holes are shown normal to a crystal surface, this is not a necessary condition of the invention. Also shown, for example is hole 459, which is not normal to the surfaces. All of these shaped features may be used individually or in combination to control the depth or angular dependence of the light scattering coefficient within the crystal.

Figure 11A:
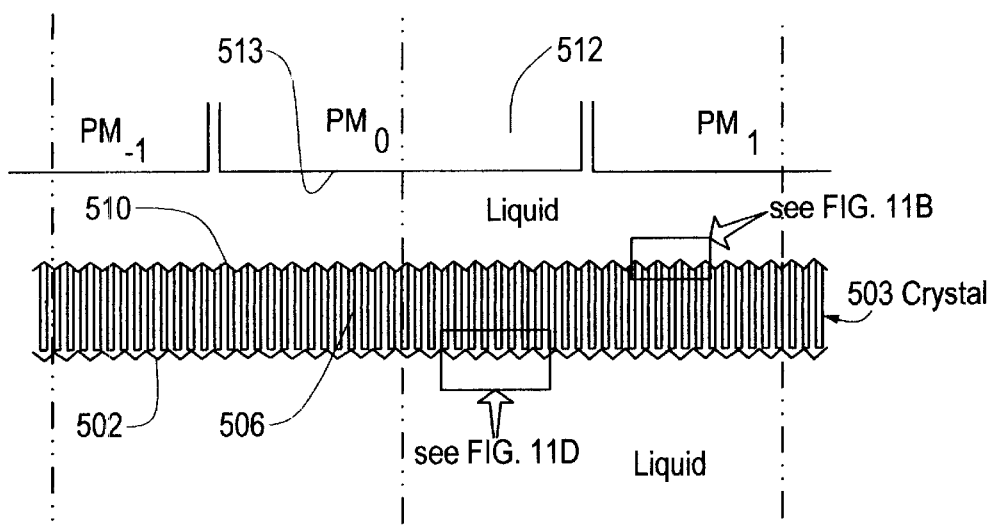
FIG. 11A is a schematic sectional view of a camera with scintillation crystal according to this invention with the addition of grooves in the upper surface proximate the photosenors and its other surface.
Figure 11B:
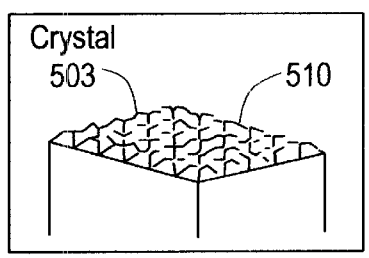
FIG. 11B is an enlarged three dimensional view of the transmissive pyramidical structures formed by the grooves in FIG. 11A.
Figure 11C:
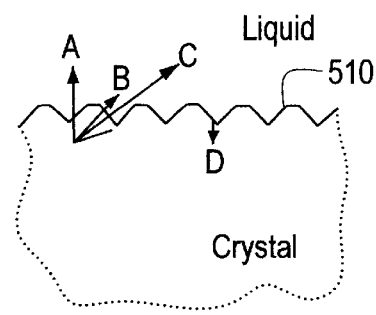
FIG. 11C is an enlarged profile view of the pyramidical structure of FIG. 11B.
Figure 11D:
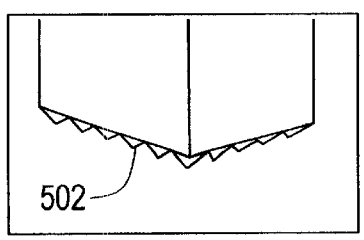
FIG. 11D is a view similar to FIG. 11B of the reflective pyramidical structures on the other side of the crystal.
Figure 11E:
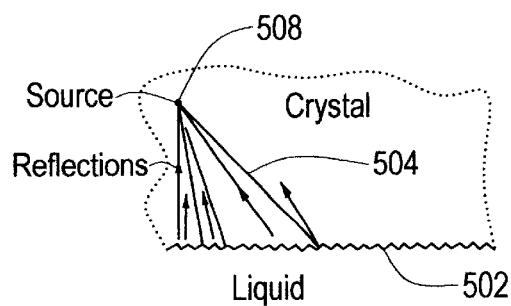
FIG. 11E is a graphical depiction of the reflections from the pyramidical structures of FIG. 11D.

FIG. 11A shows a section of a camera, 500, FIG. 3 to illustrate an alternative to the planar reflecting surface 234 of the crystal 204 of FIG. 3 to further reduce light spreads of photons. See U.S. Pat. No. 5,861,628. The bottom surface 502, FIG. 11D of the crystal 503 is shaped by cutting orthogonal grooves thereon so as to form pyramidal or truncated pyramidal structures 502. These structures are then coated with reflecting materials, such as high reflectivity metal oxides. Pyramidal reflectors 502 tend to reflect light back towards the direction of incidence as in rays 504, FIG. 11E, thus further reducing light spread. Thus, these reflectors in combination with cylindrical scattering elements 506 further reduce the light spread of photons from scintillation 508.

Also shown are pyramidal structures cut into the upper surface 510 of the crystal 500 that faces the photo detectors 512 having photocathode surfaces along a plane 513. These structures tend to increase transmission through the crystal surface 510 and also favor more forward transmission as compared to a planar surface as in rays A, B and C as opposed to ray D. In both cases, the back reflecting surfaces 506 and the transmitting surfaces 510, the structures may also be cut as spherical sections or other suitable shapes.

Figure 11F:
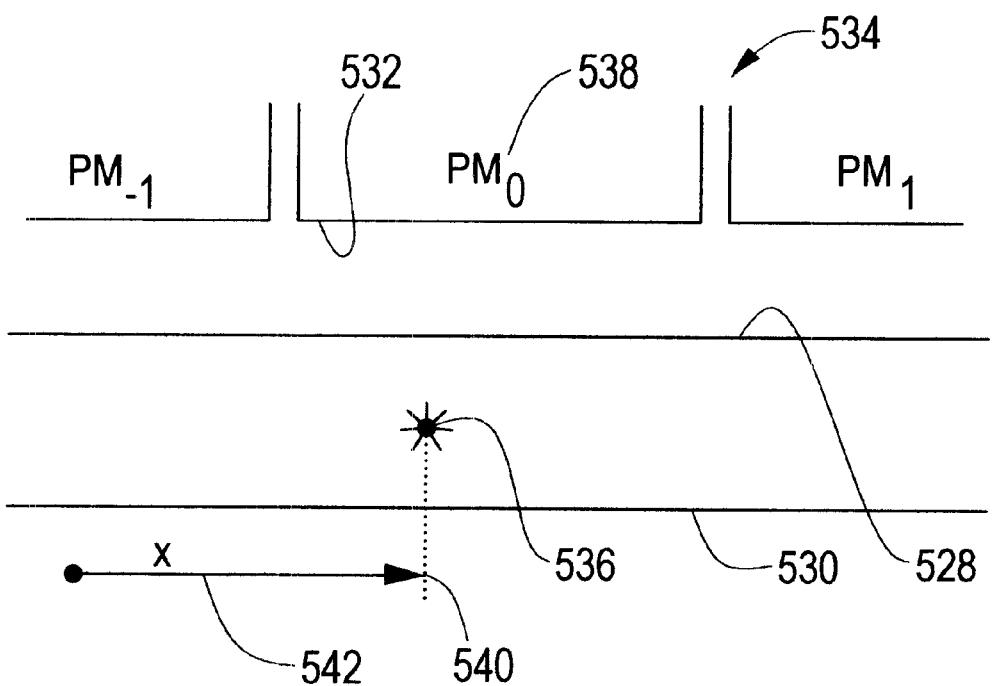
FIG. 11F is a view of a camera similar to FIG. 11A with various crystal thickness.

Camera 525, FIG. 11F, may be structured as camera 500 of FIG. 11A, except that the crystal 526 may be alternatively: (1) a homogeneous crystal, as in the crystal 40 of FIG. 1A and B, of thickness 1-cm having planar upper 528 and lower 530 surfaces, (2) a homogeneous crystal, as in the crystal 40 of FIGS. 1A and B, of thickness 3-cm having planar upper 528 and lower 530 surfaces, or (3) a 3-cm thick crystal configured as the crystal 503 of FIG. 11A. Light emitted from source 536, shown midway between upper 528 and lower 530 surfaces of crystal 526 distributes along the plane of the photomultipliers 532.

Figure 12:
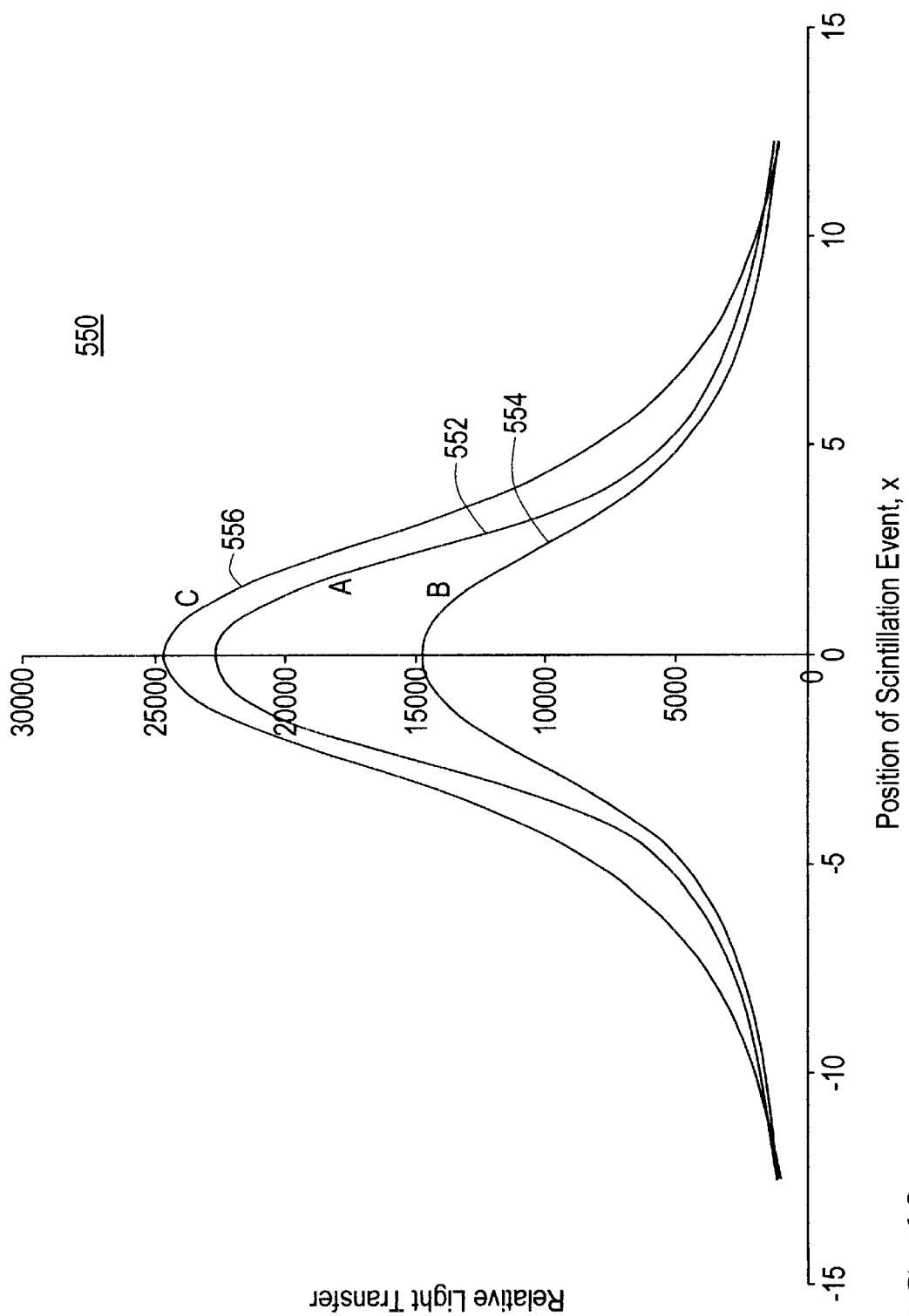
FIG. 12 is a graphical illustration of the narrowing effected using the crystal of FIG. 11A.

FIG. 12 shows the light transferred 550 to the central photomultiplier, $PM_O$ 538, FIG. 11F, by the light distributed by source 536 when three different crystal structures are used in the camera 525 of FIG. 11F. The light transfer functions 552, 554 and 556, FIG. 12, are the amount of light collected by photomultiplier, $PM_O$, 538, from scintillation light source 536 of FIG. 11F as a function of the source's x position 540 along an x axis 542 parallel to the faces of the crystal 530. Curve A 552 a computer-simulated light transfer function from a 1 cm thick conventional homogeneous planar crystal to a 50 mm square photomultiplier. Curve B 554 is the transfer function from a 3 cm thick conventional planar crystal, and curve C 556 is the light transfer function obtained from the 3 cm thick crystal 503 of FIGS. 11A–E having scattering columns 506, reflecting pyramidal structures 502, and transmitting pyramids 510. The light transfer function 554 from the conventional 3 cm homogenous crystal is shallower than that from the 1 cm homogeneous crystal 552 and has slowly descending tails 560, both undesirable features. The light transfer function 556 from the 3 cm thick crystal, configured as in FIG. 11A, however, is taller than that from the conventional 1 cm crystal 552 (collects more light) and has relatively sharper descending tails 562, both desirable features.

Figure 13:
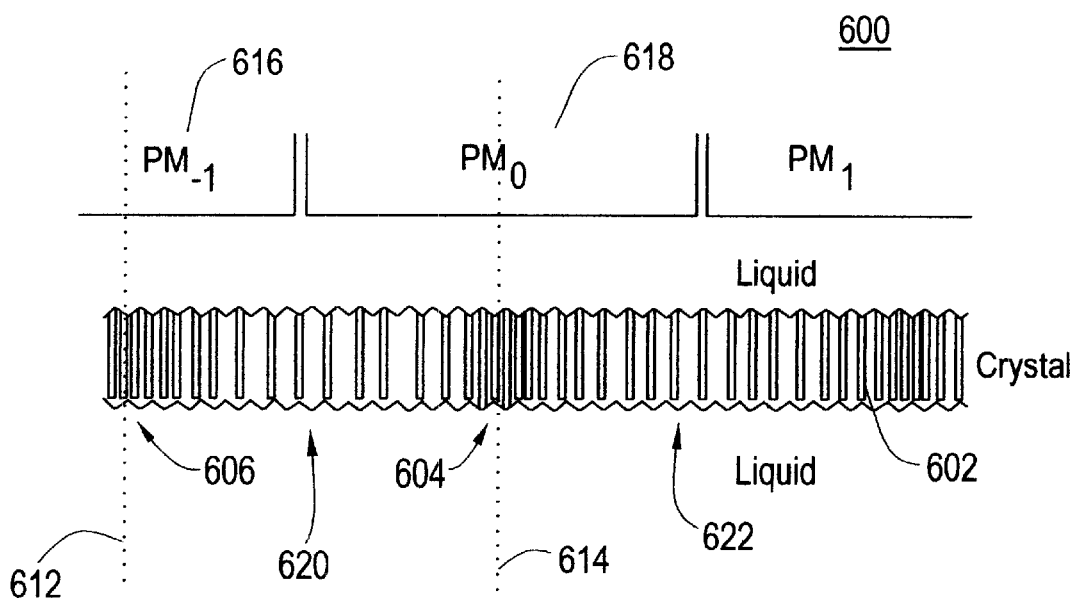
FIG. 13 is a side sectional schematic view of a camera with a crystal according to this invention in which the holes are arranged in a pattern of non-uniform density.

Although the scattering holes have been configured in rectangular (square) and triangular matrices, these examples are not exhaustive of the configurations that may be used. For example, hybrid hole patterns formed by locally randomizing the holes of rectangular or triangular patterns may also be used. Other formats will occur to those skilled in the art. It is also noted that the density of the holes need not be uniform, since non-uniform density may be preferable in certain instances. FIG. 13, for example, illustrates a lateral section of a camera 500 having channel scattering elements 602 which are denser in regions 604–606 of a crystal 610 proximal to the central axes 612 and 614 of the camera's photomultipliers 616 and 618 than in a regions 620 and 622 between them. The non-uniformity illustrated in FIG. 13 tends to narrow the light spread more in regions of higher density 612 than in low density 620 and 622 regions between centerlines of tubes 616 and 618.

Figure 14:
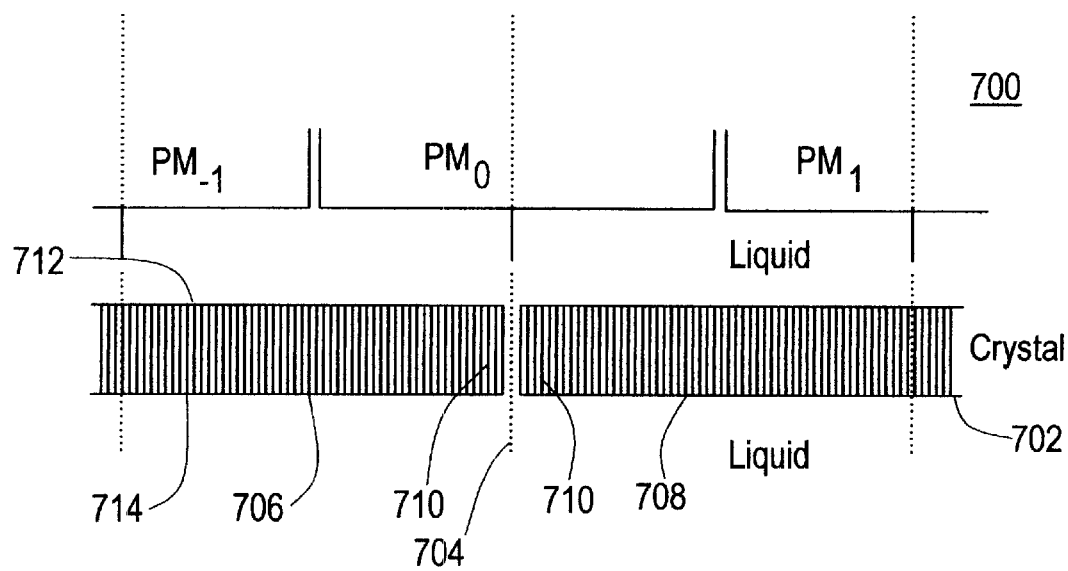
FIG. 14 is a view similar to FIG. 13 in which the crystal is segmented.

Also disclosed is the use of the scattering holes or channels in cameras containing scintillation crystals which are not continuous, as in U.S. Pat. No. 5,652,429 (Liquid Interface Scintillation Camera) and U.S. Pat. No. 5,861,628 (Scintillation Camera with Raised Edge Photomultipiers). As illustrated in FIG. 14, camera 700 contains a discontinuous crystal 702 that is segmented at location 704 into more that one part, as into crystal parts 706 and 708. Scattering columns 710 proximate to segmentation 704 reduce the optical discontinuity at the crystal junction arising from the difference in indices of refraction of the crystal (index of refraction typically 1.84) relative to the optical coupling material between the two sections, e.g., optical transmitting liquid of index 1.5. Crystal surfaces 712 and 714 maybe regular as shown or may be pyramidal as in FIGS. 11 and 13.

Figure 15A:
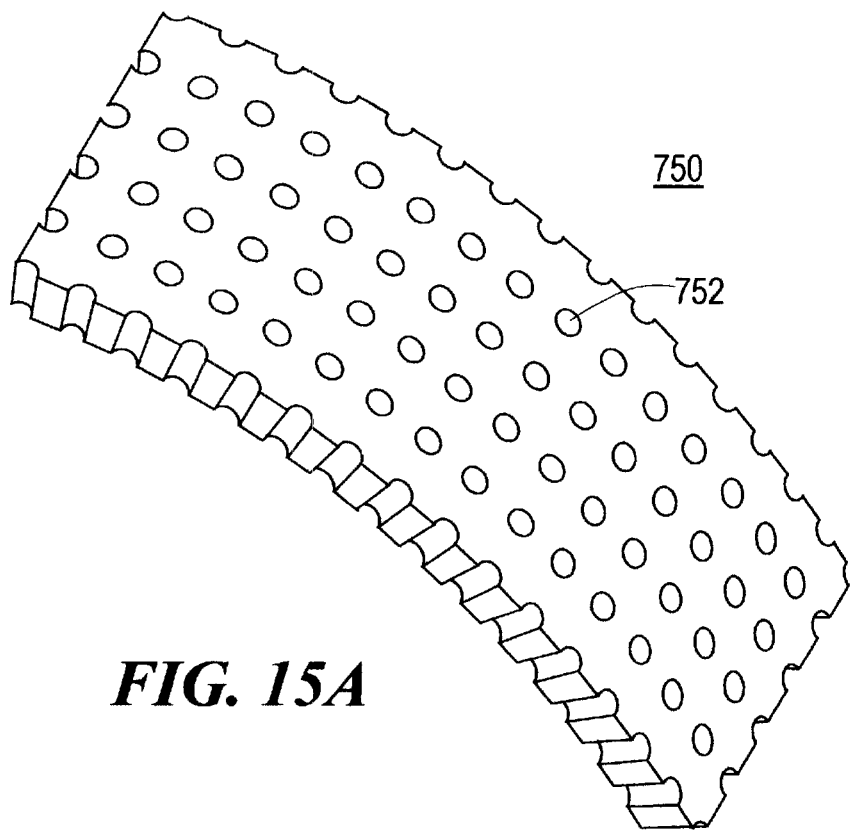
FIG. 15A is a three dimensional diagrammatic view of a segment of an arcuate crystal with scattering holes according to this invention.
Figure 15B:
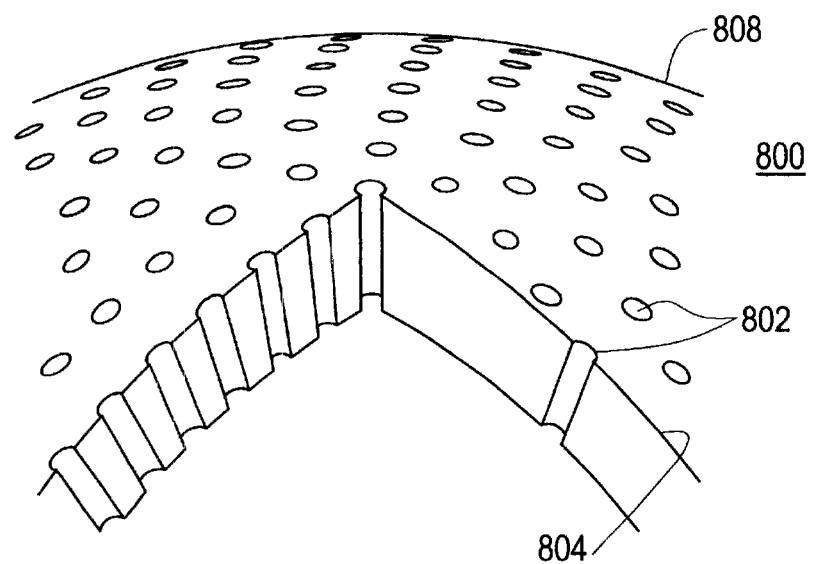
FIG. 15B is a view similar to FIG. 15A of a spherical segment.

Although in the foregoing illustrations, the methods of this invention have been confined to planar cameras, this is not a limitation of the invention. There is shown in FIG. 15A an arcuate segment of a crystal 750, which may form a segment of an arcuate camera or an annular camera. The scattering holes can be similarly arrayed by introducing holes 752 through at least one of the crystal surfaces. In FIG. 15B is also shown, for example, elements of a camera 800 having its crystal detector in the form of a segment of a spherical shell 808. Scattering channels 802 may be formed, for example, by drilling holes through at least one spherical surface 804 so as to direct scintillation light outwardly toward the periphery 806 of the spherical segment 808. Other geometrical configurations will occur to those skilled in the art.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A scintillation camera crystal comprising:
a plurality of light scattering holes in the crystal extending toward the photosensor and communicating with at least one surface of the crystal, said crystal being formed of a first material and said holes including a second material differing from said first material for deflecting the light generated by the scintillation crystal in response to incident gamma rays and reducing the spread of the generated light.

2. The scintillation crystal of claim 1 in which said holes communicate with both surfaces of the crystal.

3. The scintillation crystal of claim 1 in which said second material reflects the light.

4. The scintillation crystal of claim 1 in which said second material refracts the light.

5. The scintillation crystal of claim 1 in which said second material has a different index of refraction than said first material.

6. The scintillation crystal of claim 1 in which said second material is air.

7. The scintillation crystal of claim 1 in which said second material includes a reflective coating.

8. The scintillation crystal of claim 1 in which said holes are arranged in a random pattern.

9. The scintillation crystal of claim 1 in which said holes are arranged in a regular pattern.

10. The scintillation crystal of claim 9 in which said regular pattern includes rectangles.

11. The scintillation crystal of claim 1 in which said regular pattern includes triangles.

12. The scintillation crystal of claim 1 in which said holes are cylindrical.

13. The scintillation crystal of claim 1 in which said holes are tapered.

14. The scintillation crystal of claim 1 in which said holes are stepped.

15. The scintillation crystal of claim 1 in which said holes are inclined to the surfaces of the crystal.

16. The scintillation crystal of claim 1 in which said holes are perpendicular to the surfaces of the crystal.

17. The scintillation crystal of claim 12 in which said holes are right circular cylinders.

18. The scintillation crystal of claim 1 in which at least one of the surfaces of the crystal is grooved.

19. The scintillation crystal of claim 18 in which both of the surfaces of the crystal are grooved.

20. The scintillation crystal of claim 18 in which the grooves from an array of pyramidical structures.

21. The scintillation crystal of claim 1 in which the crystal surface towards the photosensors is transmissive.

22. The scintillation crystal of claim 21 in which the other crystal surface is reflective.

23. The scintillation crystal of claim 1 in which the holes are arranged in a uniform density pattern.

24. The scintillation crystal of claim 1 in which the holes are arranged in a non-uniform density pattern.

25. The scintillation crystal of claim 1 in which the crystal is segmental.

26. The scintillation crystal of claim 1 in which the holes are of uniform shape.

27. The scintillation crystal of claim 1 in which the holes are of uniform size.

28. The scintillation crystal of claim 1 in which the crystal is spherical.

29. The scintillation crystal of claim 1 in which the crystal is arcuate.

30. The scintillation crystal of claim 1 in which the crystal is planar.

* * * * *